United States Patent [19]
Koch et al.

[11] 3,722,856
[45] Mar. 27, 1973

[54] BALL VALVE WITH SEPARABLE END FITTING

[75] Inventors: Ulrich H. Koch; Stephen Matousek, both of Moraga; Gary Soderlund, Livermore, all of Calif.

[73] Assignee: Whitye Research Tool Co., Emeryville, Calif.

[22] Filed: Oct. 26, 1971

[21] Appl. No.: 192,493

[52] U.S. Cl. ................................ 251/152, 251/315
[51] Int. Cl. .............................................. F16k 5/06
[58] Field of Search......251/148, 151, 152, 363, 368, 251/315; 137/454.2

[56] References Cited

UNITED STATES PATENTS

| | | | |
|---|---|---|---|
| 3,056,577 | 10/1962 | Kolisek | 251/315 |
| 2,479,612 | 8/1949 | Glidden | 285/363 X |
| 2,895,496 | 7/1959 | Sanctuary | 251/151 X |
| 3,072,139 | 1/1963 | Mosites | 137/454.2 X |
| 3,141,686 | 7/1964 | Smith et al | 285/368 X |

Primary Examiner—William R. Cline
Attorney—Sharpe and Mulholland

[57] ABSTRACT

The specification and drawings disclose a valve including a main body having an internal valve chamber connected with first and second flow passages. Cooperating with the first flow passage is a first end fitting which holds the valve member and seats in the main body. The first end fitting is connected to the main body by bolts which extend through it into threaded engagement with the body. Threaded end portions of the bolts extend outwardly of the body adjacent the second passage. A second end fitting cooperates with the second passage and includes openings through which freely pass the threaded end portions of the bolts. Nuts are threaded on the outer end of the bolts to clamp the second end fitting to the main body. This allows the valve to serve as a union since the second end fitting can be removed without disturbing the valve member.

4 Claims, 3 Drawing Figures

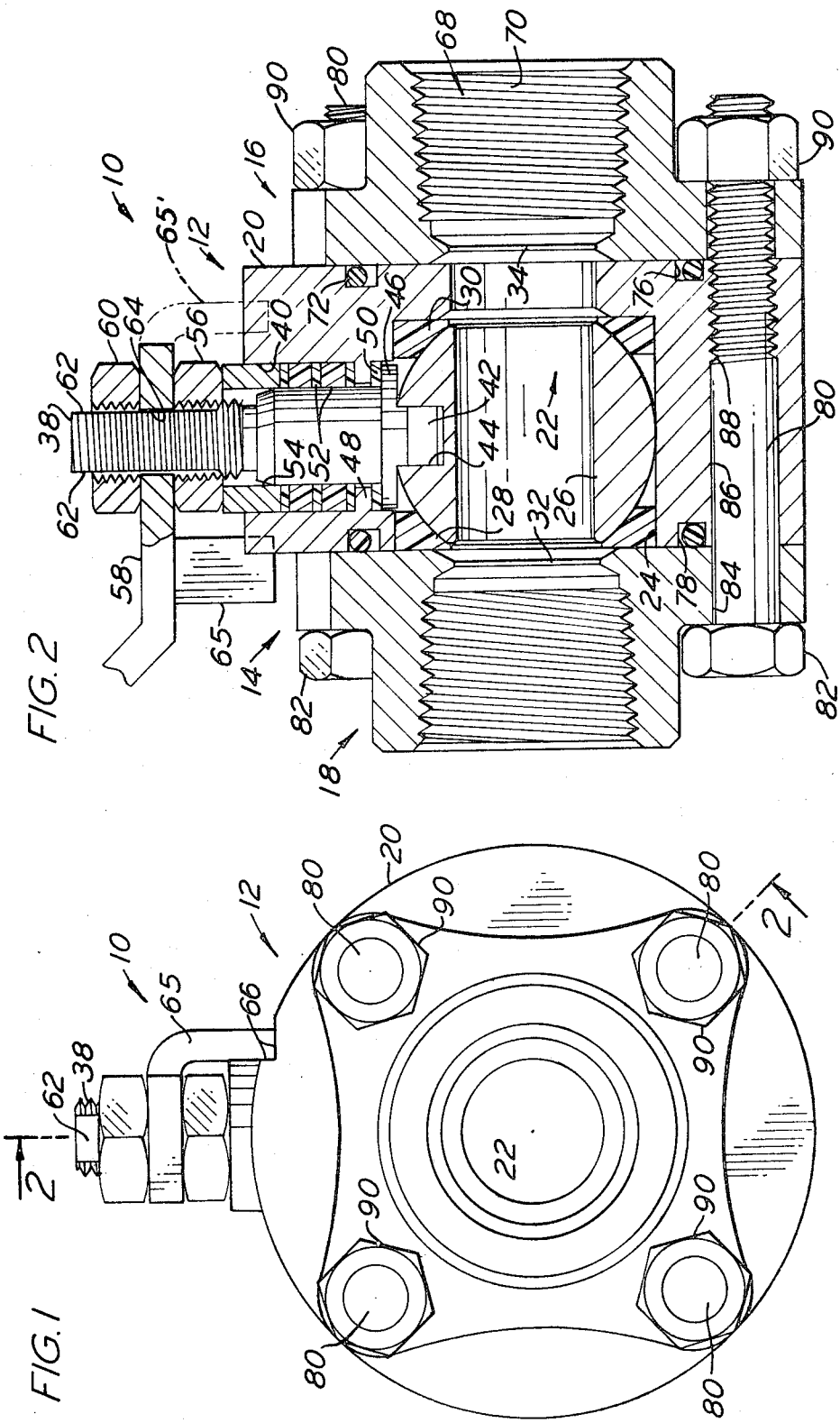

BALL VALVE WITH SEPARABLE END FITTING

The subject invention is directed toward the valve art and, more particularly, to an improved valve having a readily removable end fitting.

The invention is particularly suited for use in ball valves and will be described with particular reference thereto; however, as will become apparent, the invention could be embodied in other types of valves.

Ball valves are known in which the bodies or housings are constructed in a manner such that one of the end flanges or fittings can be removed without disturbing the ball. The valve can be shut off and a line or associated equipment on the outlet side of the valve removed. Thus, the valve can function both as a flow controlling element and as a union.

A typical prior ball valve having a readily removable end fitting included a central body portion which housed the ball and the seats. One end fitting was attached to the central body by a first set of bolts which extended through the body into tapped openings in an intermediate plate carried on the opposite end of the central body portion. The other end fitting was, in turn, connected to the intermediate plate by a second set of bolts passing through the end fitting into the plate. By simply removing the second set of bolts, the end fitting could be detached without disturbing the valve ball. A valve of the general type described is shown, for example, in U.S. Pat. No. 2,895,496, issued July 21, 1959.

The described prior art arrangement functions satisfactorily; however, it does have certain disadvantages. For example, the complexity of a valve is substantially increased since it requires an additional major component, the plate, and several additional minor components, e.g., the second set of bolts and seals. Moreover, the use of the plate introduces an additional point for possible valve leakage.

The subject invention overcomes the above-discussed problems and provides a valve of the general type described wherein one end fitting can be removed without disturbing the internal components of the valve. The invention does not increase the complexity of the valve and does not introduce added leak points.

In particular, the invention contemplates a valve comprising a main body including an internal valve chamber connected with first and second flow passages. Cooperating with the first flow passage is a first end fitting including means to connect it with associated piping or the like. The first end fitting is connected to the main body by threaded means extending through the first end fitting and into threaded engagement with the body. A threaded end portion of the threaded means extends outwardly of the body adjacent the second passage. A second end fitting cooperates with the second passage and includes an opening through which the threaded end portion of the threaded means freely extends. A nut means is threaded on the outer end of the threaded means to clamp the second end fitting to the main body.

The threaded means is preferably merely a bolt which passes through the first end fitting, the main body, and the second end fitting. The head of the bolt clampingly engages the first end fitting and its threaded end is received in, and extends through, a tapped opening in the body. The second end fitting is thus merely connected to the body by a nut attached to the outwardly extending threaded end of the bolt.

As can be appreciated, the second end fitting can be removed simply by taking off the nut (or nuts, if more than one bolt is used). Removal of the second end fitting does not, however, release the first end fitting or affect the valve's ability to block flow through the valve chamber.

Accordingly, a primary object of the invention is the provision of a simplified valve construction in which at least one of the end fittings can be removed without removing the other end fitting, disturbing the valve member, or affecting the valve's ability to control flow.

Another object is the provision of a ball valve of the general type described wherein the ball member and the seats are retained in the body by one end fitting while the other end fitting is removed.

The above and other objects and advantages will become apparent from the following description when read in conjunction with the accompanying drawings wherein:

FIG. 1 is an end view of a ball valve formed in accordance with the preferred embodiment of the invention;

FIG. 2 is a cross-sectional view taken on line 2—2 of FIG. 1; and,

Figure 3:
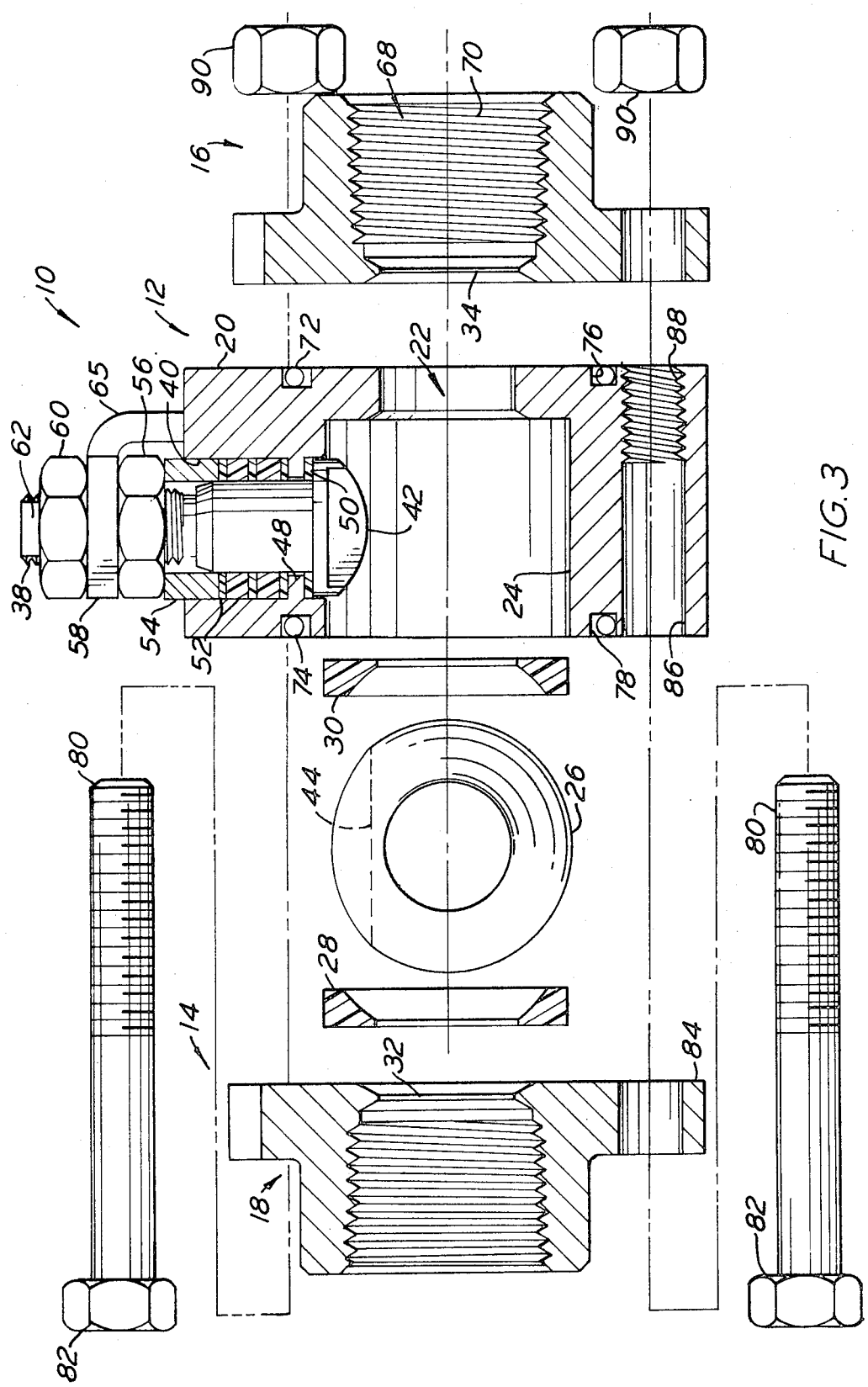
FIG. 3 is a cross-sectional view similar to FIG. 2 but showing the valve partially disassembled.

Referring more particularly to the drawings, the preferred embodiment of the invention is shown as comprising a ball valve assembly indicated generally by the reference numeral 10 and including a main body portion 12, a rotatable valve ball and actuating assembly 14, and removable end fittings 16 and 18.

As will become apparent hereafter, the details of the various components could vary substantially from that shown; however, the main body portion 12 is illustrated as a generally cylindrical one-piece housing or body formed from metal or any suitable material. A generally axially located center bore or passage 22 is formed through the housing 20. A large diameter counterbore 24 is formed inwardly from the left end of passage 22 (as viewed in FIG. 2) to define the interior valve chamber. A valve member in the form of a ball 26 is positioned within the valve chamber. Suitable seal or seat defining rings 28 and 30 engage the exterior of the ball about the inlet and outlet flow passages 32 and 34, respectively. The particular shape or type of seat rings used in the valve is not important to the subject invention and substantially any of the many well known seat ring constructions could be used.

The ball is provided with a through flow bore and is adapted to be rotated between the open position shown in FIG. 2 and a closed position at right angles thereto. For this purpose, an operating stem member 38 extends outwardly of the housing 20 through an opening 40. In the embodiment under consideration, the operating stem 38 has a generally cylindrical configuration and a transverse web end portion 42 which is received within a slot or groove 44 formed in the ball 26. An outwardly extending flange or shoulder 46 is formed immediately above the web 42 and is retained under an inwardly extending flange 48 formed within the bore 40. A washer of suitable resilient material 50 is positioned between the opposed surfaces of the flange 46 and the flange 48 to provide a bearing and seal for the stem. Above the flange 48 is shown a packing comprising a series of rings or washers of resilient material such as polytetrafluoroethylene or the like. The packing is compressed by a sleeve-like gland member 54 which is closely received in the outer end of bore 40 and is in engagement with the top of the packing. The gland 54 is compressed into engagement with the packing by a nut member 56 carried on the threaded upper end of the stem 38.

The stem and ball are rotated by a handle member 58 connected to the stem 38 by a nut 60. It will be noted that flats 62 are formed on opposite sides of the threaded end portion of the stem 38. The opening 64 through the handle member 58 is sized so as to engage the flats 62 to allow rotation of the handle to produce rotation of the stem.

Movement of the handle 58 is preferably limited between a full open and a full closed position by a stop plate 64 which extends downwardly from the side of the handle (as best seen in FIG. 1) and engages longitudinal slot or groove 66 formed in the exterior surface of the housing 20. It will be noted that the stop plate 64 is located such that when the valve is in the open position shown in FIG. 2, the lateral side of the stop plate engages the side of the groove; however, when rotated ninety degrees, the side edge of the plate engages as shown by dotted lines identified as 64'.

Connected to opposite sides of the housing of the body are the removable end fittings 16 and 18. Although the end fittings 16 and 18 could differ from each other in shape, type, etc., they are shown as being identical in construction. Accordingly, only one will be described in detail but the description thereof is to be taken as equally as applicable to the other unless otherwise noted. In particular, the end fitting 16 is shown as having a central passageway 68 which is interiorly threaded to allow it to be connected to an associated piping system. Each of the end fittings is clampingly joined to the housing 20 and joints between the end fittings and the housing are sealed by O-ring seal members 72 and 74 positioned within grooves 76 and 78 formed circumferentially about the inlet and outlet flow passages 34 and 32.

The apparatus thus far described is relatively conventional and could vary widely from that shown. Of particular importance to the invention is the manner in which the end fittings are connected to the body such that the end fitting 16 located on the outlet end of the valve can be removed without disturbing the valve member. That is, the valve ball can be shifted to an off position while the end fitting 16 and the connecting piping are removed. Thus, the valve can perform its flow control functions and also serve as a union.

In the particular embodiment under consideration, the end fittings are connected to the body or housing 20 by four bolts 80 which extend completely through the body. As best shown in FIGS. 2 and 3, the bolts are positioned with head ends 82 in engagement with the flange portion of end fitting 18. The bolts pass freely through openings 84 in the flange portion. Aligned openings 86 are formed through the housing or body 20. It is important to note, however, that the right-hand end of the openings 86 (as viewed in FIGS. 2 and 3) are threaded as shown at 88. Thus, tightening of the bolts 80 causes the end fitting 18 to be tightly clamped to the body. The end fitting 16 is received on the threaded outer ends of the bolts and clamped to the body by nuts 90. It should be noted that the end fitting 16 can be quickly removed merely by releasing the nuts 90. Releasing the nuts 90 does not, of course, affect the valve ball 26 or the seal between the end fitting 18 and the body.

As best seen in FIG. 3, in the subject embodiment the seal rings 28, 30 are compressed into sealing engagement with the ball 26 by the end fitting 18. Thus, so long as the bolts 82 are maintained in a tightened condition in the body 20, the valve will be capable of performing its flow control function. If it is necessary to change the seal rings 28, 30, the bolts 18 are removed from the body releasing the end fitting 18 and allowing the ball and seal rings to be removed from the counterbore 24.

As can be appreciated from the foregoing, an extremely simple valve structure is provided which permits the valve to serve as a union. No additional major or minor components are required and the size and complexity of the valve are not increased.

The invention has been described in great detail sufficient to enable one of ordinary skill in the valve art to make and use the same. Obviously, modifications and alterations of the preferred embodiment will occur to others upon a reading and understanding of the specification and it is my intention to include all such modifications and alterations as part of my invention insofar as they come within the scope of the appended claims.

What is claimed is:

1. A valve comprising:
   a main body-forming portion having first and second ends including a first bore extending inwardly from the first end to define a first flow passage and a valve chamber, a second bore extending inwardly from said second end to define a second flow passage, said second bore being of a smaller diameter than said first bore and aligned therewith to define an internal annular shoulder;
   a ball valve member positioned in said valve chamber with a first seat member positioned between said ball and said annular shoulder, and a second seat member positioned at the outer end of said first bore;
   a first end fitting including means for connecting a flow line thereto associated with said first end, said first end fitting adapted to sealingly engage said second seat member;
   a second end fitting including means for connecting a flow line thereto associated with second end; and,
   attaching means for releasably connecting said first and second end fittings to said main body, said attaching means including a plurality of bolts extending inwardly through the first end fitting into threaded engagement with said main body, the head portions of said bolts engaging said first end fitting so that tightening of said bolts clamps said first end fitting to said body, said bolts having threaded end portions extending outwardly of said body on said second end and passing freely through said second end fitting, and nut members on said threaded ends for clamping said second end fitting to said main body.

2. The valve as defined in claim 1 including seal rings between said end fittings and said body.

3. The valve as defined in claim 1 wherein said bolts are generally parallel to said first and second bores.

4. The valve as defined in claim 1 wherein said bolts are located circumferentially about said first bore.

* * * * *